Aug. 5, 1930.  A. J. A. BLARINGHEM  1,772,202
PROCESS FOR THE EXTRACTION OF KRYPTON AND XENON FROM OXYGEN
Filed Nov. 5, 1924
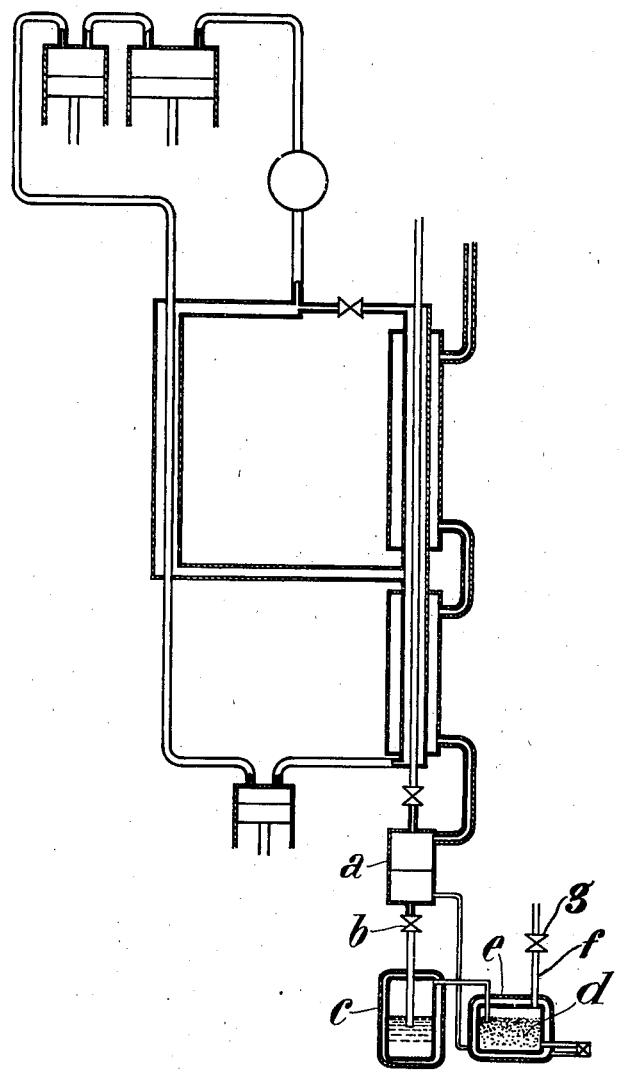
A. J. A. Blaringhem
INVENTOR
By: Marks & Clerk
Attys Patented Aug. 5, 1930

1,772,202

UNITED STATES PATENT OFFICE

AUGUSTE JULES ADRIEN BLARINGHEM, OF MAZINGARBE, FRANCE, ASSIGNOR TO SOCIÉTÉ ANONYME D'ECLAIRAGE ET D'APPLICATIONS ELECTRIQUES, OF PAS-DE-CALAIS, FRANCE

PROCESS FOR THE EXTRACTION OF KRYPTON AND XENON FROM OXYGEN

Application filed November 5, 1924, Serial No. 747,996, and in France December 26, 1923.

By simple fractional distillation of liquid air or even of liquid oxygen coming from an oxygen apparatus based on the liquefaction of air, it is possible to obtain, in the residue of distillation, only a relatively small fraction of the quantities of krypton and xenon present in the initial liquid.

In fact, my researches show that, if the distillation has the result of progressively increasing the concentration of krypton and xenon in the liquid phase, the proportions of these rare gases present in the gaseous phase also increase much quicker.

In order to diminish the considerable losses due to this fact, the present invention consists in subjecting industrial liquid oxygen, which does not possess a suitable concentration in krypton, to two simultaneous fractionations, which are effected, one on the liquid phase, and the other on the gaseous phase. The first fractionation has the purpose of progressively increasing, in the liquid phase, the concentrations of krypton and xenon, whilst the second has for its purpose to extract as completely as possible the same gases from the gaseous phase.

The enriching of the liquid can be simply attained by spontaneous evaporation and the impoverishment of the gas, arising from this liquid, results from its passage through a suitable absorbent material (coco-nut charcoal, for instance) maintained at a sufficiently low temperature.

By vaporization, industrial liquid oxygen gives a gas in which the concentration of krypton first increases slowly, and afterwards very quickly. A gas richer in krypton and xenon is thus subjected to the action of the absorbent substance. As the efficiency of the latter becomes greater, this explains the high output obtained by this method of extraction of krypton and xenon from atmospheric air.

In practice, it suffices to cause the absorbent material to act when the concentration of krypton, in the gas, reaches at least one one-hundred-thousandth ($\frac{1}{100000}$), this corresponding to a liquid about 8 or 10 times richer. In liquid oxygen issued from industrial apparatus, the content in krypton seems always inferior to this figure. It is therefore of interest to bring liquid oxygen to the above indicated concentration in krypton, by fractional distillation for instance, before subjecting the vaporization gas to fractional absorption.

All things being equal, the output is so much higher, as the temperature of the absorbent material is lower. This material is maintained at the minimum temperature consistent with the operation, by simply immersing the vessel which contains it in the liquid oxygen subjected to the treatment.

A particularly simple method of carrying out the invention described above consists in subjecting, in a large d'Arsonval-Dewar flask, liquid oxygen to spontaneous evaporation and in forcing the gas, resulting from the vaporization, to pass through a vessel filled with coco-nut charcoal, for instance, and immersed in the liquid oxygen itself.

When the greater part of the liquid has vaporized, a new batch of liquid oxygen, which may previously have been brought to the concentration of about eight one-hundred-thousandths ($\frac{8}{100000}$) in krypton, is introduced in the flask until saturation of the absorbent material is reached. At the end of the operation, nearly the total amount of krypton and the greater part of xenon are in the absorption vessel, whilst a small quantity of krypton and a portion of xenon have remained in the final atmosphere of the flask.

The accompanying drawing shows diagrammatically a plant for carrying out the process.

The liquid oxygen produced by the plant is collected in a tank $a$. A certain quantity of liquid oxygen is caused to pass by means of the cock $b$ in a d'Arsonval-Dewar flask $c$. The liquid oxygen is vaporized therein and the gases produced pass through a vessel $d$ containing the absorbing material. This vessel $d$ is immersed in a bath of liquid oxygen coming, for instance, from the tank $a$. The vaporized oxygen leaves vessel $d$ by means of pipe $f$ and valve $g$.

What I claim as my invention and desire to secure by Letters Patent is:—

1. In a process for the separation of krypton and xenon from liquid oxygen containing the same, the steps which comprise fractionally distilling a predetermined quantity of liquid oxygen to continuously increase the concentration of krypton and xenon in said liquid oxygen, as well as the proportion of said rare gases in the gaseous phase, and simultaneously causing the gaseous phase of said liquid oxygen to pass through an absorbent for the krypton and xenon.

2. In a process for the separation of krypton and xenon from liquid oxygen containing the same, the steps which consist in isolating a certain quantity of liquid oxygen, fractionally distilling the said quantity to continuously increase the concentration of krypton and xenon in the liquid phase, as well as the proportion of said rare gases in the gaseous phase, and simultaneously causing the gaseous phase of said liquid oxygen to pass through an absorbent for the krypton and xenon.

In testimony whereof I have signed my name to this specification.

AUGUSTE JULES ADRIEN BLARINGHEM.